(12) United States Patent
Kwon

(10) Patent No.: US 11,001,216 B2
(45) Date of Patent: May 11, 2021

(54) DRIVER SEAT AIRBAG

(71) Applicant: HYUNDAI MOBIS CO., LTD., Seoul (KR)

(72) Inventor: Oh Koang Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 86 days.

(21) Appl. No.: 16/270,121

(22) Filed: Feb. 7, 2019

(65) Prior Publication Data
US 2019/0241143 A1 Aug. 8, 2019

(30) Foreign Application Priority Data
Feb. 7, 2018 (KR) .................. 10-2018-0015347

(51) Int. Cl.
*B60R 21/203* (2006.01)
*B60Q 5/00* (2006.01)
*B60R 21/2165* (2011.01)

(52) U.S. Cl.
CPC .......... *B60R 21/2035* (2013.01); *B60Q 5/003* (2013.01); *B60R 21/2037* (2013.01); *B60R 21/21658* (2013.01)

(58) Field of Classification Search
CPC ............ B60R 21/2037; B60R 21/2035; B60R 21/203; B60R 21/21658; B60Q 5/003; B60Q 5/00
USPC .............................. 280/731; 200/61.54, 61.55
See application file for complete search history.

(56) References Cited

U.S. PATENT DOCUMENTS

| | | | |
|---|---|---|---|
| 6,616,181 B1 * | 9/2003 | Ford ...................... | B60Q 5/003 200/61.54 |
| 2005/0012311 A1 * | 1/2005 | Schneider .............. | B60Q 5/003 280/731 |
| 2005/0161308 A1 * | 7/2005 | Frisch .................... | B60Q 5/003 200/61.54 |
| 2006/0016613 A1 * | 1/2006 | McLauchlan .......... | B60Q 5/003 174/53 |
| 2007/0256916 A1 * | 11/2007 | Worrell ................ | B60Q 1/0082 200/61.54 |
| 2011/0101650 A1 * | 5/2011 | Nebel .................... | B60Q 5/003 280/728.1 |

FOREIGN PATENT DOCUMENTS

WO     WO-0050264 A1 *  8/2000  ............. B60Q 5/003

OTHER PUBLICATIONS

Definition of "Outer"; Merriam-Webster; https://www.merriam-webster.com/dictionary/outer; Oct. 17, 2020.*

* cited by examiner

*Primary Examiner* — Keith J Frisby
(74) *Attorney, Agent, or Firm* — DLA Piper LLP (US)

(57) ABSTRACT

A driver seat airbag may include: a mounting plate seated on a wheel armature; a cover coupled to the mounting plate so as to be lifted and lowered; an elastic member installed between the mounting plate and the cover to apply an elastic force to the cover; an electrode unit installed in the mounting plate; and a connector installed on the cover and connected to the electrode unit when the cover is lowered.

12 Claims, 7 Drawing Sheets

DRIVER SEAT AIRBAG

CROSS-REFERENCES TO RELATED APPLICATIONS

The present application claims priority to Korean application number 10-2018-0015347, filed on Feb. 7, 2018, which is incorporated by reference in its entirety.

BACKGROUND OF THE INVENTION

The present invention relates to a driver seat airbag, and more particularly, to a driver seat airbag which can reduce the number of parts, and simplify an assembly process.

In general, a vehicle has a plurality of airbags installed therein. The steering wheel of the vehicle has a driver seat airbag installed therein. The driver seat airbag has a cover coupled to the top of a mounting plate. The mounting plate has an anode wire formed through insert-injection molding.

The cover has a horn guide installed thereon, the horn guide has a horn spring installed therein, and the horn spring has a horn rod installed therein. The mounting plate has a horn contact facing the horn rod. As the horn rod is connected to the anode wiring, the horn rod functions as an anode. Furthermore, the horn contact is grounded to a wheel armature and functions as a cathode.

When a driver presses the cover, the cover is slightly lowered, and the horn rod is electrically connected to the horn contact. As the horn rod is connected to the horn contact, the horn is operated.

In the conventional driver seat airbag, however, the number of parts is increased because the horn guide, the horn spring and the horn rod are installed in the cover. Therefore, assembly tolerance may occur, which makes it difficult to maintain the quality.

Furthermore, since the driver seat airbag requires a process of assembling the horn guide, the horn spring and the horn rod and pressing the horn contact when the cover is assembled, the assembly process of the cover may become complex, and the assembly time may be increased.

Furthermore, since the number of parts is increased and the assembly process becomes complex, the cost competitiveness may be degraded.

SUMMARY OF THE INVENTION

Embodiments of the present invention are directed to a driver seat airbag capable of reducing the number of parts and simplifying an assembly process.

In one embodiment, a driver seat airbag may include: a mounting plate seated on a wheel armature; a cover coupled to the mounting plate so as to be lifted and lowered; an elastic member installed between the mounting plate and the cover to apply an elastic force to the cover; an electrode unit installed in the mounting plate; and a connector installed on the cover and connected to the electrode unit when the cover is lowered.

The electrode unit may include: an anode installed so as to be exposed to the outer surface of the mounting plate; and a cathode installed so as to be exposed to the outer surface of the mounting plate, and separated from the anode.

The connector may be connected simultaneously to the anode and the cathode when the cover is lowered.

The anode may have an anode extension formed in the horizontal direction, the cathode may have a cathode extension formed in the horizontal direction, and the anode extension and the cathode extension may be separated from each other.

The anode extension and the cathode extension may be formed in parallel to each other.

The connector may include: a connector body fitted onto the bottom of the cover; and an elastic connection extended from the connector body, and disposed facing the anode extension and the cathode extension.

The elastic connection may include: a first connection protrusion formed so as to be connected to the anode extension when the cover is lowered; and a second connection protrusion formed so as to be connected to the cathode extension when the cover is lowered, and separated from the first connection protrusion.

A distance between the first connection protrusion and the second connection protrusion may correspond to a distance between the anode extension and the cathode extension.

The first connection protrusion and the second connection protrusion may be spaced apart from the inner surface of the cover.

The first connection protrusion and the second connection protrusion may be formed in a round shape.

The mounting plate may have a guide pipe formed at the circumference thereof in a top-to-bottom direction, the elastic member may be installed in the guide pipe, and the cover may have a boss which is inserted into the guide pipe and pressurizes the elastic member when the cover is lowered.

The mounting plate may have a constraint part protruding from the outer surface thereof, the cover may have a constraint hole into which the constraint part is inserted, and the constraint hole may limit the lifting and lowering range of the cover.

The connector may be formed of a conductive material.

In accordance with the embodiment of the present invention, since the connector is installed so as to be connected to the electrode unit when the cover is lowered, a horn guide, a horn spring and a horn rod may not be installed. Thus, the number of parts can be reduced, and the assembly structure can be simplified.

Furthermore, since the anode and the cathode are installed in the mounting plate, a wire may not be installed or injection-molded in the cover.

DESCRIPTION OF SPECIFIC EMBODIMENTS

Hereafter, a driver seat airbag in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
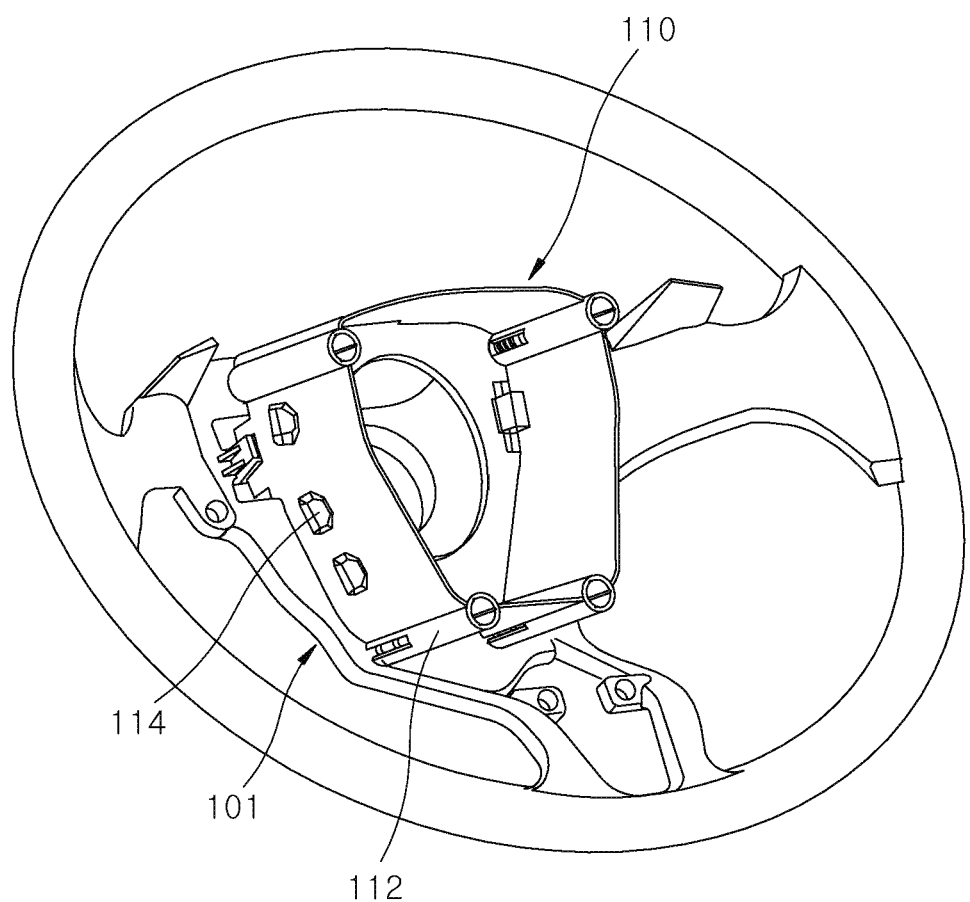
FIG. 1 is a perspective view illustrating that a mounting plate of a driver seat airbag in accordance with an embodiment of the present invention is installed.
Figure 2:
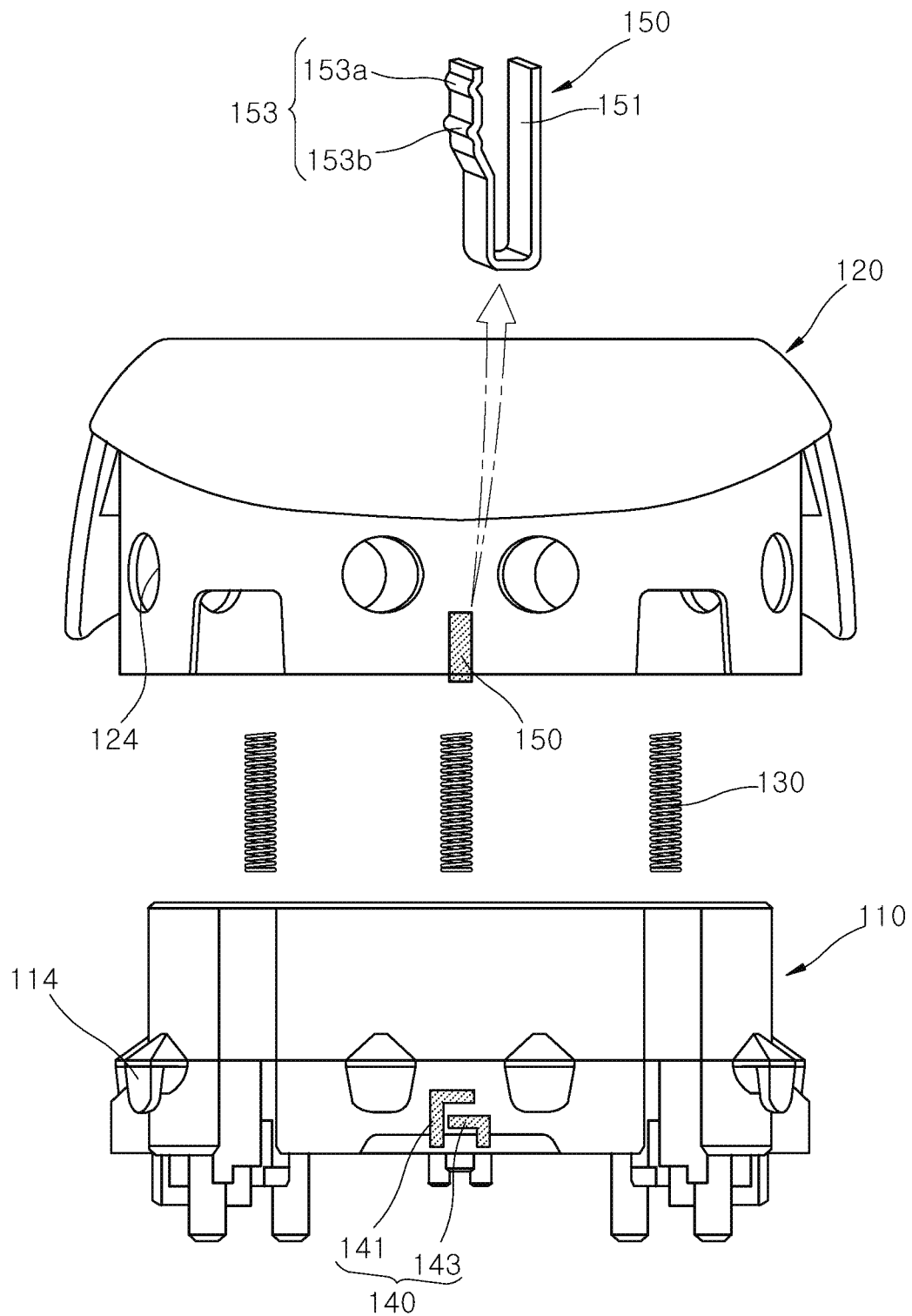
FIG. 2 is an exploded view of the driver seat airbag in accordance with the embodiment of the present invention.
Figure 3:
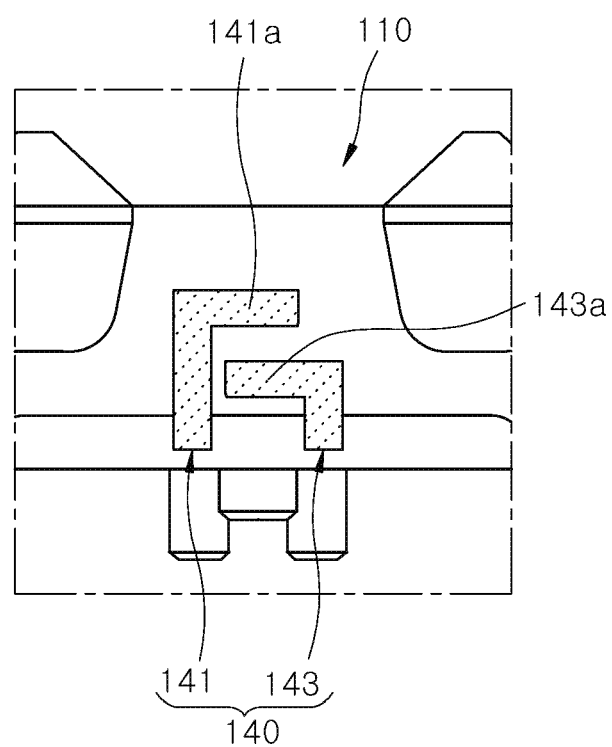
FIG. 3 is an expanded view of an electrode unit in the driver seat airbag in accordance with the embodiment of the present invention.
Figure 4:
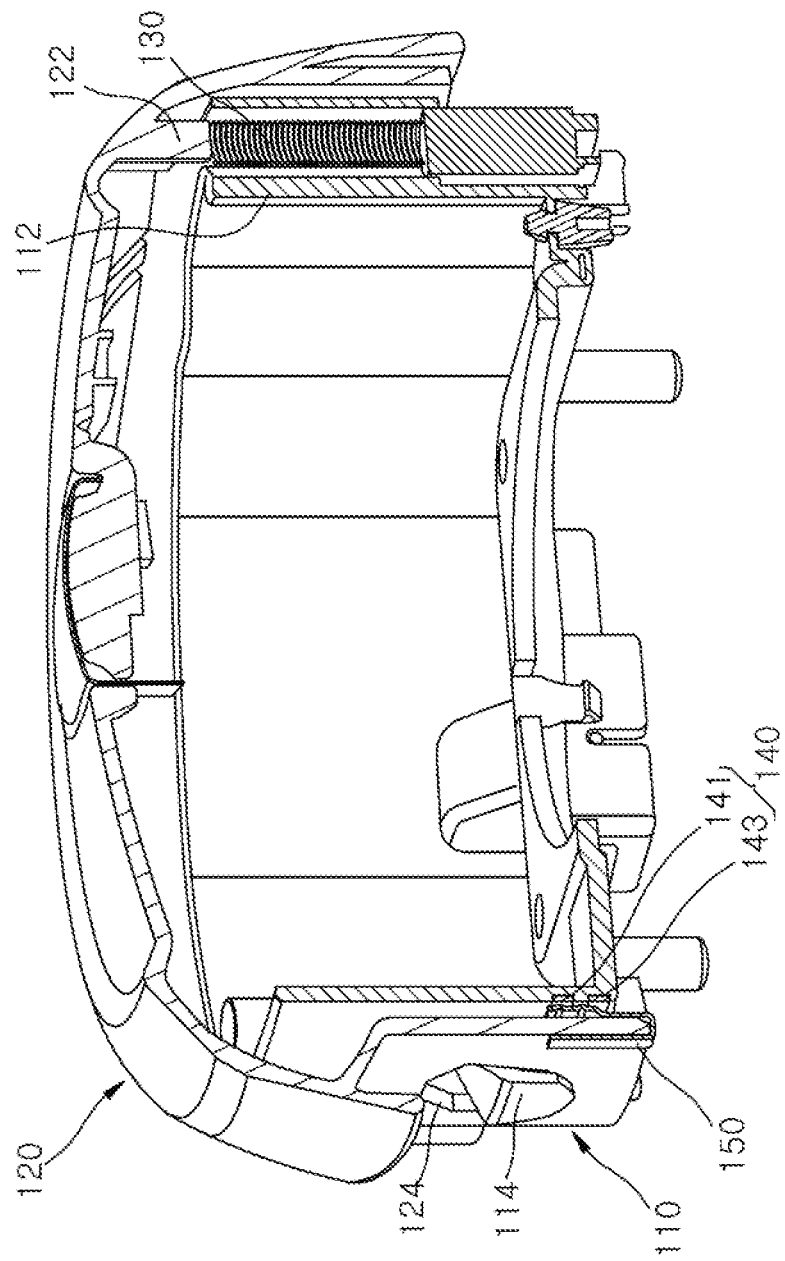
FIG. 4 is a cross-sectional view of the driver seat airbag in accordance with the embodiment of the present invention.
Figure 5:
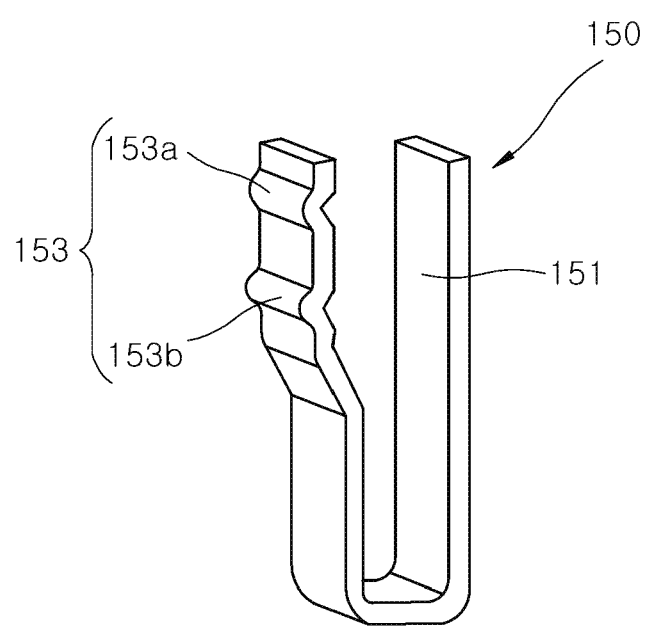
FIG. 5 is a perspective view of a connector in the driver seat airbag in accordance with the embodiment of the present invention.
Figure 6:
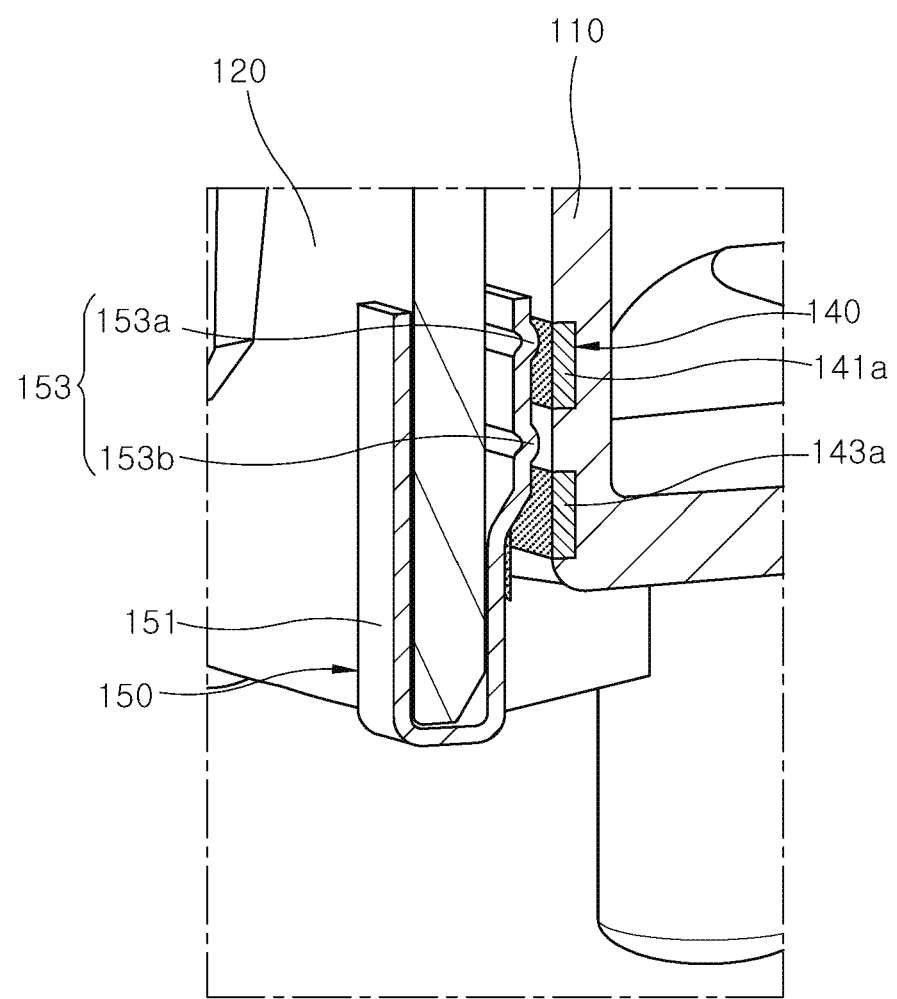
FIG. 6 is an expanded view illustrating that the connector is separated from a cathode in the driver seat airbag in accordance with the embodiment of the present invention, when a cover is moved upward.
Figure 7:
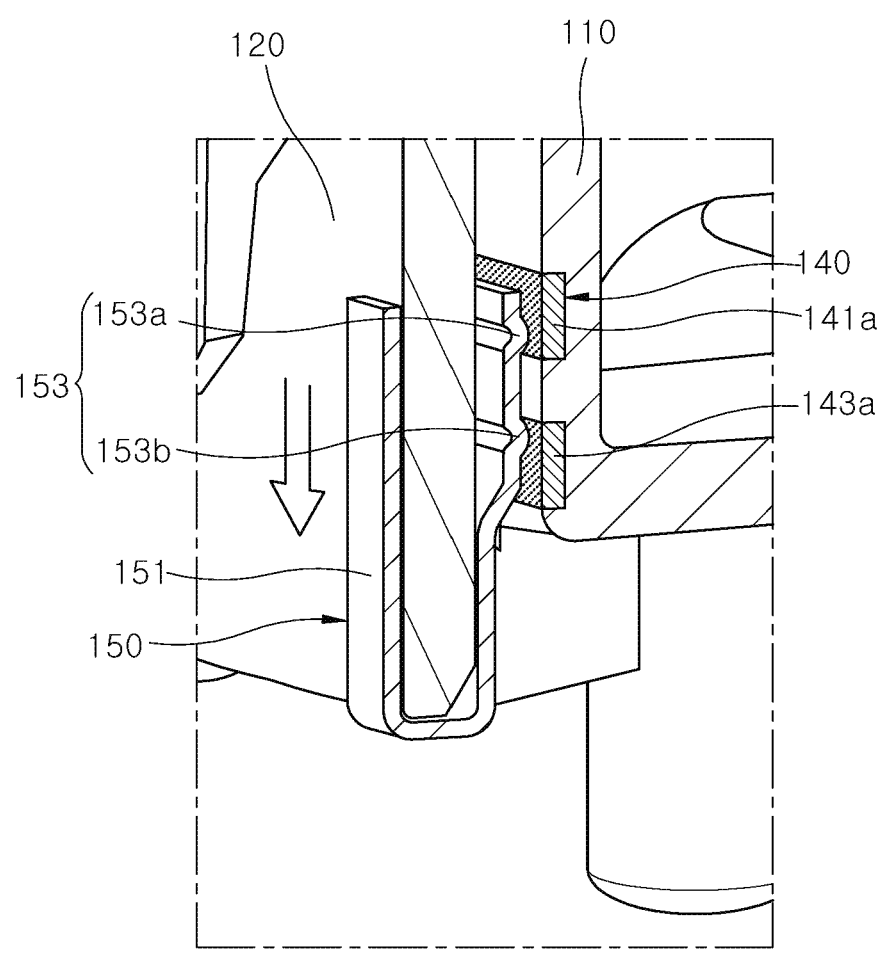
FIG. 7 is an expanded view illustrating that the connector is connected to an anode and the cathode in the driver seat airbag in accordance with the embodiment of the present invention, when the cover is moved downward.

FIG. 1 is a perspective view illustrating that a mounting plate of a driver seat airbag in accordance with an embodiment of the present invention is installed, FIG. 2 is an exploded view of the driver seat airbag in accordance with the embodiment of the present invention, FIG. 3 is an expanded view of an electrode unit in the driver seat airbag in accordance with the embodiment of the present invention, FIG. 4 is a cross-sectional view of the driver seat airbag in accordance with the embodiment of the present invention, FIG. 5 is a perspective view of a connector in the driver seat airbag in accordance with the embodiment of the present invention, FIG. 6 is an expanded view illustrating that the connector is separated from a cathode in the driver seat airbag in accordance with the embodiment of the present invention, when a cover is moved upward, and FIG. 7 is an expanded view illustrating that the connector is connected to an anode and the cathode in the driver seat airbag in accordance with the embodiment of the present invention, when the cover is moved downward.

Referring to FIGS. 1 to 7, the driver seat airbag in accordance with the embodiment of the present invention may include a mounting plate 110, a cover 120, an elastic member 130, an electrode unit 140 and a connector 150.

The mounting plate 110 may be seated on a wheel armature 101. The mounting plate 110 may have an airbag cushion (not illustrated) folded and housed therein. Since the wheel armature 101 is grounded to a cathode, the wheel armature 101 may be negatively charged.

The cover 120 may be coupled to the mounting plate 110 so as to be lifted and lowered. At this time, the mounting plate 110 may have a constraint part 114 protruding from the outer surface thereof, and the cover 120 may have a constraint hole 124 into which the constraint part 114 is inserted. The constraint hole 124 may be formed in such a size that the constraint part 114 can be moved within a predetermined range in the top-to-bottom direction, when the cover 120 is lifted and lowered. The constraint hole 124 may limit the lifting and lowering range of the cover 120.

The elastic member 130 may be installed between the mounting plate 110 and the cover 120 so as to apply an elastic force to the cover 120 in the direction that the cover 120 is lifted. Examples of the elastic member 130 may include a coil spring installed in the top-to-bottom direction. The elastic member 130 may be contracted in the longitudinal direction when the cover 120 is lowered, and extended to the original state when the cover 120 is lifted.

The mounting plate 110 may have a guide pipe 112 formed at the circumference thereof in the top-to-bottom direction, the elastic member 130 may be installed in the guide pipe 112, and the cover 120 may have a boss 122 which is inserted into the guide pipe 112 and pressurizes the elastic member 130 when the cover 120 is lowered. As the boss 122 pressurizes the elastic member 130 when the 120 is lowered, the elastic member 130 may be contracted in the longitudinal direction.

The electrode unit 140 may be installed in the mounting plate 110. Since the electrode unit 140 is installed in the mounting plate 110, a wire may be easily connected to the electrode unit 140.

The connector 150 may be installed on the cover 120 so as to be connected to the electrode unit 140 when the cover 120 is lowered. The connector 150 may be formed of a conductive material such as copper or aluminum.

Since the connector 150 is installed on the cover 120, a wire may not be installed or injection-molded in the cover 120. Furthermore, since the connector 150 is installed so as to be connected to the electrode unit 140 when the cover 120 is lowered, a horn guide, a horn spring and a horn rod do not need to be installed. Therefore, the length of the wire and the number of parts can be reduced, and the assembly structure can be simplified.

Since the electrode unit 140 is installed in the mounting plate 110 and the connector 150 is installed on the cover 120, the assembly process of the cover 120 may be simplified, and the assembly time can be reduced.

The electrode unit 140 may include an anode 141 and a cathode 143. The anode 141 may be installed so as to be exposed to the outer surface of the mounting plate 110. The cathode 143 may be installed so as to be exposed to the outer surface of the mounting plate 110, and separated from the anode 141. An anode wire may be connected to the anode 141, and the cathode 143 may be grounded to the wheel armature 101 which is negatively charged. Since the anode 141 and the cathode 143 are installed in the mounting plate 110, a wire may not be installed or injection-molded in the cover 120.

The anode 141 may have an anode extension 141a formed in the horizontal direction, the cathode 143 may have a cathode extension 143a formed in the horizontal direction, and the anode extension 141a and the cathode extension 143a may be separated from each other. The anode extension 141a and the cathode extension 143a may be formed in parallel to each other.

Since the anode extension 141a and the cathode extension 143a are separated from each other, the horn may not operate when the connector 150 is not connected to the anode extension 141a and the cathode extension 143a at the same time.

When the cover 120 is lowered, the connector 150 may be connected to the anode 141 and the cathode 143 at the same time. Since the connector 150 may be simultaneously connected to the anode 141 and the cathode 143 when the cover 120 is lowered, a wire may not be connected to the connector 150. Thus, the installation structure of the wire can be simplified, and the installation length of the wire can be reduced.

The connector 150 may include a connector body 151 and an elastic connection 153.

The connector body 151 may be fitted onto the bottom of the cover 120. The connector body 151 may be formed in a U-shape so as to be fitted onto the bottom of the cover 120. The connector body 151 may be fixed onto the bottom of the cover 120 through its elasticity.

The elastic connection 153 may be extended from the connector body 151, spaced apart from the inner surface of the cover 120, and disposed facing the anode extension 141a and the cathode extension 143a. Since the elastic connection 153 is spaced apart from the inner surface of the cover 120, the elastic connection 153 may be elastically deformed toward the inner surface of the cover 120 as the elastic connection 153 is connected to the anode extension 141a and the cathode extension 143a at the same time.

The elastic connection 153 may include a first connection protrusion 153a which is formed thereon so as to be connected to the anode extension 141a and a second connection protrusion 153b which is formed thereon so as to be connected to the cathode extension 143a and separated from the first connection protrusion 153a. The first connection protrusion 153a and the second connection protrusion 153b may be separated to such an extent that the elastic connection 153 can be connected to the anode extension 141a and the cathode extension 143a at the same time. The first connection protrusion 153a and the second connection protrusion 153b may be formed in a round shape. The first connection protrusion 153a and the second connection protrusion 153b may be formed in the widthwise direction of the elastic connection 153. Since the first connection protrusion 153a and the second connection protrusion 153b are formed in a protruding shape, a frictional force with the anode extension 141a and the cathode extension 143a can be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A driver seat airbag comprising:
   a mounting plate seated on a wheel armature;
   a cover coupled to the mounting plate and configured to move along a first direction parallel to an outer side wall surface of the mounting plate;
   an elastic member installed between the mounting plate and the cover to apply an elastic force to the cover;
   an electrode unit installed in the mounting plate; and
   a connector installed on the cover,
   wherein the electrode unit comprises:
      an anode disposed at least partially on the outer side wall surface of the mounting plate; and
      a cathode disposed at least partially on the outer side wall surface of the mounting plate, and separated from the anode,
   wherein the connector is configured to, in response to the cover being moved along the first direction parallel to the outer side wall surface of the mounting plate, transition from a first position in which the connector is connected to only one of the anode and the cathode to a second position in which the connector is connected to both of the anode and the cathode.

2. The driver seat airbag of claim 1, wherein the anode has an anode extension formed along a second direction perpendicular to the first direction in which the cover is configured to move, the cathode has a cathode extension formed along the second direction, and the anode extension and the cathode extension are separated from each other.

3. The driver seat airbag of claim 2, wherein the anode extension and the cathode extension are formed in parallel to each other.

4. The driver seat airbag of claim 2, wherein the connector comprises:
   a connector body fitted onto the bottom of the cover; and
   an elastic connection extended from the connector body, and disposed facing the outer side wall surface of the mounting plate.

5. The driver seat airbag of claim 4, wherein the elastic connection comprises:
   a first connection protrusion configured to be in contact with the anode extension when the connector is in the second position in which the connector is connected to both of the anode and the cathode; and
   a second connection protrusion configured to be in contact with the cathode extension when the connector is in the second position in which the connector is connected to both of the anode and the cathode, wherein the second connection protrusion is separated from the first connection protrusion.

6. The driver seat airbag of claim 5, wherein a distance between the first connection protrusion and the second connection protrusion corresponds to a distance between the anode extension and the cathode extension.

7. The driver seat airbag of claim 5, wherein the first connection protrusion and the second connection protrusion are spaced apart from an inner surface of the cover that is in contact with a portion of the connector.

8. The driver seat airbag of claim 5, wherein the first connection protrusion and the second connection protrusion are formed in a round shape.

9. The driver seat airbag of claim 1, wherein the mounting plate has a guide pipe formed at the circumference thereof in a top-to-bottom direction,
   the elastic member is installed in the guide pipe, and
   the cover has a boss which is inserted into the guide pipe and pressurizes the elastic member when the cover is lowered.

10. The driver seat airbag of claim 1, wherein the mounting plate has a constraint part protruding from the outer surface thereof,
   the cover has a constraint hole into which the constraint part is inserted, and
   the constraint hole limits the lifting and lowering range of the cover.

11. The driver seat airbag of claim 1, wherein the connector is formed of a conductive material.

12. A driver seat airbag comprising:
   a mounting plate seated on a wheel armature;
   a cover coupled to the mounting plate so as to be lifted and lowered;
   an elastic member installed between the mounting plate and the cover to apply an elastic force to the cover;
   an electrode unit installed in the mounting plate, wherein the electrode unit comprises:
      an anode installed so as to be exposed to an outer surface of the mounting plate, and
      a cathode installed so as to be exposed to the outer surface of the mounting plate, and separated from the anode; and
   a connector installed on the cover, wherein the connector is connected simultaneously to the anode and the cathode when the cover is lowered,
   wherein the anode has an anode extension formed in a horizontal direction,
   wherein the cathode has a cathode extension formed in the horizontal direction,
   wherein the anode extension and the cathode extension are separated from each other,
   wherein the connector comprises:
      a connector body fitted onto a bottom portion of the cover, and an elastic connection extending from the connector body, and disposed facing the anode extension and the cathode extension.

* * * * *